United States Patent
Kawamoto et al.

(10) Patent No.: US 8,375,270 B2
(45) Date of Patent: Feb. 12, 2013

(54) SIGNAL TRANSMISSION METHOD AND TRANSMITTER IN RADIO MULTIPLEX TRANSMISSION SYSTEM

(75) Inventors: Junichiro Kawamoto, Tokyo (JP); Takahiro Asai, Tokyo (JP); Kenichi Higuchi, Tokyo (JP); Mamoru Sawahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 245 days.

(21) Appl. No.: 12/785,859

(22) Filed: May 24, 2010

(65) Prior Publication Data

US 2010/0235710 A1 Sep. 16, 2010

Related U.S. Application Data

(62) Division of application No. 10/571,129, filed as application No. PCT/JP2004/012966 on Sep. 7, 2004, now abandoned.

(30) Foreign Application Priority Data

Sep. 9, 2003 (JP) ................................ 2003-317464

(51) Int. Cl.
*H03M 13/00* (2006.01)
(52) U.S. Cl. ................. 714/757; 714/752; 714/788
(58) Field of Classification Search .................. 714/757, 714/752, 762, 788, 780, 755
See application file for complete search history.

(56) References Cited

U.S. PATENT DOCUMENTS

| | | | | |
|---|---|---|---|---|
| 3,414,845 | A | * | 12/1968 | Lucky .............................. 333/18 |
| 5,687,181 | A | * | 11/1997 | Suemura et al. .............. 714/757 |
| 5,710,789 | A | * | 1/1998 | Snodgrass et al. ........... 375/134 |
| 5,844,741 | A | | 12/1998 | Yamakawa et al. |
| 6,324,224 | B1 | * | 11/2001 | Ikeda ............................. 375/341 |
| 6,381,727 | B1 | * | 4/2002 | Ikeda ............................ 714/780 |

(Continued)

FOREIGN PATENT DOCUMENTS

| | | |
|---|---|---|
| EP | 0 933 138 A2 | 4/2000 |
| EP | 1 056 236 A2 | 11/2000 |

(Continued)

OTHER PUBLICATIONS

Supplementary European Search Report issued Jan. 27, 2012 in patent application No. 04787670.1.

(Continued)

*Primary Examiner* — Fritz Alphonse
(74) *Attorney, Agent, or Firm* — Oblon, Spivak, McClelland, Maier & Neustadt, L.L.P.

(57) ABSTRACT

A signal transmission method in a radio multiplex transmission system that includes serial-to-parallel converting of serial data to be transmitted into N parallel data series and independently performing an error-correcting encoding process on the parallel signals of the N data series. The method further includes parallel-to-serial converting of the parallel signals encoded with error-correcting codes, performing an interleaving process on the parallel-to-serial converted signals and serial-to-parallel converting the interleaved signals into L parallel data series and transmitting each of the L data series. The transmitted signals are then received and separated into M data series and are parallel-to-serial converted and a deinterleaving process is performed. The method also includes serial-to-parallel converting the deinterleaved signals into N data series, independently performing an error-correcting decoding process on the parallel signals of the N data series serial-to-parallel converted, and parallel-to-serial converting the signals in which the error-correcting codes are decoded.

2 Claims, 8 Drawing Sheets

U.S. PATENT DOCUMENTS

| | | | |
|---|---|---|---|
| 6,473,878 | B1 * | 10/2002 | Wei .............................. 714/755 |
| 6,501,810 | B1 | 12/2002 | Karim et al. |
| 2002/0191535 | A1 | 12/2002 | Sugiyama et al. |
| 2003/0014713 | A1 | 1/2003 | Morioka et al. |
| 2003/0021355 | A1 | 1/2003 | You |
| 2003/0103584 | A1 | 6/2003 | Bjerke et al. |
| 2005/0099939 | A1 | 5/2005 | Huh et al. |
| 2005/0157811 | A1 | 7/2005 | Bjerke et al. |
| 2007/0064831 | A1 | 3/2007 | Bjerke et al. |
| 2008/0212657 | A1 | 9/2008 | Bjerke et al. |

FOREIGN PATENT DOCUMENTS

| | | |
|---|---|---|
| EP | 1 249 980 A2 | 10/2002 |
| JP | 08-329619 | 12/1996 |
| JP | 2002-335166 | 11/2002 |
| JP | 2003-032122 | 1/2003 |
| WO | 03/047118 A2 | 6/2003 |
| WO | WO 03/049397 A2 | 6/2003 |

OTHER PUBLICATIONS

Funatsu, Ryo et al., "A Study on Layered Turbo Codes on MIMO Channels", The Institute of Electronics, Information and Communication Engineers, vol. 102, No. 675, pp. 7-12, 2003. (with English abstract).

Nakajima, Akinori et al., "Turbo Coded MIMO System with Adaptive Parallel Interference Canceller", The Institute of Electronics, Information and Communication Engineers, vol. 103, No. 66, pp. 61-68, 2003. (with English abstract).

Ito, Takumi et al., "MF and MMSE Combined Iterative Soft Interference Canceller for MIMO/OFDM Systems", The Institute of Electronics, Information and Communication Engineers, vol. 102, No. 674, pp. 117-124, 2003.

Maeda, Noriyuki et al., "Performance Comparison of Channel Interleaving Methods in Frequency Domain for VSF-OFCDM Broadband Wireless Acess in Forward Link", IEICE Trans. Commun., vol. E86-B, No. 1, pp. 300-313, Jan. 2003.

European Office Action mailed on Oct. 19, 2012, issued for EP Application No. 04 787 670.1-2415 (English).

European Office Action mailed on Oct. 8, 2012, issued for EP Application No. 12178389.8-2415 (English).

Ka Leong et al: "Performance Comparison of Layered Space Time Codes." Proceedings of IEEE International Conference on Communications—Apr. 28-May 2, 2002—New York, NY, USA, IEEE, Piscataway, NJ, USA, vol. 3, Apr. 28, 2002, pp. 1382-1387.

Koike T et al: "Spatial Interleaving for Vector Viterbi Equalizer with Super-Trellis Decoding in Trellis-Coded Space-Time Transmission." 14th IEEE 2003 International Sypmosium on Personal, Indoora nd Mobile Radio Communication Proceedings On Sep. 7-10, 2003, IEEE, Piscatwaay, NJ, USA, vol. 2, Sep. 7, 2003, pp. 1302-1306.

* cited by examiner

_US 8,375,270 B2_

SIGNAL TRANSMISSION METHOD AND TRANSMITTER IN RADIO MULTIPLEX TRANSMISSION SYSTEM

REFERENCE TO RELATED APPLICATIONS

This application is a divisional application of and claims the benefit of U.S. application Ser. No. 10/571,129 entitled "Signal Transmitting Method And Transmitter In Radio Multiplex Transmission System" filed on Dec. 26, 2006, which claims priority of JP 2003-317464, filed Sep. 9, 2003, the entire contents of both applications being incorporated herein by reference.

TECHNICAL FIELD

The present invention generally relates to a signal transmission method and a transmitter in a radio multiplex transmission system and more particularly to a transmission method and a transmitter in a MIMO transmission system, in which the amount of processing for error-correcting encoding, interleaving, and deinterleaving and/or error-correcting decoding is reduced.

BACKGROUND ART

In a radio communication method such as CDMA, for example, it is important to realize a high-speed information rate. One known signal transmission method uses MIMO (Multiple-Input Multiple-Output) channels with plural transmission/reception antennas in order to achieve such a rate. In the MIMO transmission method, both a transmission side and a reception side have N disposed antennas and plural different signals are efficiently transmitted at the same time using the same frequency band through a network with N port inputs and N port outputs connected via a radio circuit. In other words, the method is intended to enlarge the capacity of transmission by increasing the numbers of transmission antennas and reception antennas so as to use space in a multiple manner.

In the MIMO multiplexing method as shown in FIG. 1, when plural different transmission symbols are transmitted at the same time with each of the N transmission antennas 124 using the same frequency and the same spread code, these transmission symbols are synthesized in space. This can be interpreted that the transmission symbols are multiple-valued in space in a certain sense, so that the information rate can be increased to several times that of the transmission antennas.

In this MIMO multiplexing method, known techniques for realizing a high-reliability transmission employ error-correcting encoding and interleaving. For example, conventional techniques are disclosed in "Takumi ITO, Xiaodong WANG, Yoshikazu KIMURA, Mohammad MADIHIAN, and Akihisa USHIROKAWA "MF and MMSE Combined Iterative Soft Interference Canceller for MIMO/OFDM Systems" The Technical Report of the Institute of Electronics, Information and Communication Engineers of Japan, RCS2002-295, pp. 117-124, March, 2003" (Non-patent Document 1).

FIG. 2 shows an example of a conventional MIMO transmission system. A transmitter 210 comprises an error-correcting encoder 214, an interleaver 218, a serial-to-parallel converter 212, and N antennas 224. A receiver 240 comprises N antennas 254, a signal separator 252, a parallel-to-serial converter 242, a deinterleaver 248, and an error-correcting decoder 244. Interleaving is a process for switching the order of encoded bit data series prior to modulation and performing the reverse operation after demodulation. The interleaving is used to separate and relocate burst errors exceeding several code words (block codes) or a constraint length (trellis codes) in order to accurately decode exact random errors with a high probability in accordance with designed codes.

In the transmitter 210, transmission data 211 are encoded with error-correcting codes, interleaved, and then resultant serial data is serial-to-parallel converted, thereby gaining N parallel data sets. Each parallel data set is transmitted using the corresponding transmission antenna 224.

Then, each of the antennas 254 of the receiver 240 receives signals transmitted from the transmitter 210. The received signals are separated into N parallel signals using the signal separator 252 of the receiver 240. The N parallel signals after the signal separation are parallel-to-serial converted, deinterleaved, and the error-correcting codes are decoded.

In this example of conventional techniques, information before the serial-to-parallel conversion is encoded with error-correcting codes and interleaved, so that improved effects on the characteristics of an error rate are expected using a space diversity effect.

Non-patent Document 1: "MF and MMSE Combined Iterative Soft Interference Canceller for MIMO/OFDM Systems" by Takumi ITO, Xiaodong WANG, Yoshikazu KIMURA, Mohammad MADIHIAN, and Akihisa USHIROKAWA, The Technical Report of the Institute of Electronics, Information and Communication Engineers of Japan, RCS2002-295, pp. 117-124, March, 2003

For example, in a CDMA mobile communication system such as WCDMA, CDMA 2000, and the like, it is required that an ultra high-speed information rate be realized. And regarding that requirement, it is possible to increase the information rate by applying the MIMO multiplexing method as mentioned above in which parallel transmission of information is performed using plural transmission antennas. However, when a conventional structural method as shown in FIG. 2 is used, very high-speed processing is required in the error-correcting encoder 214 and the interleaver 218 of the transmitter 210, and in the deinterleaver 248 and the error-correcting decoder 244 of the receiver 240. Also, the size of the interleaver and the deinterleaver must be enlarged. For example, when information is transmitted on the assumption that the number of the transmission antennas is N=4 and the information is transmitted at 250 Mbps in each antenna, it is required that the error-correcting encoder 214 and the interleaver 218 of the transmitter 210, and the deinterleaver 248 and the error-correcting decoder 244 of the receiver 240 process data at 250×4=1000 Mbps=1 Gbps. This high-speed processing imposes a heavy work load in terms of implementation and thus poses a problem.

DISCLOSURE OF THE INVENTION

The present invention has been made in view of the aforementioned problem. It is a general object of the present invention to provide an improved and useful MIMO transmission system in which the above-mentioned problem is eliminated.

A more specific object of the present invention is to provide a MIMO transmission system in which the amount of processing for error-correcting encoding, interleaving, and/or error-correcting decoding is reduced in a transmitter and/or a receiver.

Another object of the present invention is to provide a MIMO transmission system as mentioned above such that even a space diversity effect is obtained.

In order to achieve the aforementioned objects, according to one aspect of the present invention, a signal transmission method in a radio multiplex transmission system comprises the steps of: serial-to-parallel converting serial data to be transmitted into N (N: two or more) parallel data series; independently performing an error-correcting encoding process and/or an interleaving process on the parallel signals of the N data series serial-to-parallel converted; transmitting each of the processed signals using plural transmission antennas; receiving the transmitted signals; separating the received signals into M (M: two or more) data series; independently performing a deinterleaving process and/or an error-correcting decoding process on each of the separated signals; and parallel-to-serial converting the processed signals, thereby recovering the transmitted data.

Accordingly, it is possible to conduct the error-correcting encoding/decoding process and the interleaving/deinterleaving process in a parallel manner. Thus, it is possible to reduce the amount of processing in each encoder/decoder and interleaver/deinterleaver to one Nth or one Mth.

According to another aspect of the present invention, a signal transmission method in a radio multiplex transmission system comprises the steps of: serial-to-parallel converting serial data to be transmitted into M (M: two or more) parallel data series; independently performing an error-correcting encoding process on the parallel signals of the M data series serial-to-parallel converted; parallel-to-serial converting the parallel signals encoded with error-correcting codes; performing an interleaving process on the parallel-to-serial converted signals; serial-to-parallel converting the interleaved signals into N (N: two or more) parallel data series and transmitting each of the N data series using plural transmission antennas; receiving the transmitted signals; separating the received signals into M (M: two or more) data series and parallel-to-serial converting the M data series; performing a deinterleaving process on the parallel-to-serial converted signals; serial-to-parallel converting the deinterleaved signals into N data series; independently performing an error-correcting decoding process on the parallel signals of the N data series serial-to-parallel converted; and parallel-to-serial converting the signals in which error-correcting codes are decoded, thereby recovering the transmitted data.

A signal reception method in a radio multiplex transmission system comprises the steps of: receiving signals transmitted from a transmitter, using plural antennas; separating the received signals into N (N: two or more) data series and parallel-to-serial converting the N data series; performing a deinterleaving process on the parallel-to-serial converted signals; serial-to-parallel converting the deinterleaved signals into M parallel data series; independently performing an error-correcting decoding process on the parallel signals of the M data series serial-to-parallel converted; and parallel-to-serial converting the signals in which error-correcting codes are decoded, thereby recovering the transmitted data.

Accordingly, it is possible to perform the error-correcting encoding/decoding process in a parallel manner. Thus, it is possible to reduce the amount of processing in each encoder/decoder to one Mth and also to gain a space diversity effect.

According to the transmission method and the transmitter of embodiments of the present invention, the following effects can be obtained.

(1) On the transmission side, the error-correcting encoding process and the interleaving process are performed for each of the transmission antennas after information is serial-to-parallel converted into the same number of data series as the transmission antennas. On the reception side, the deinterleaving process and the error-correcting decoding process are performed on each of the signal data series after the signal separation. Transmitted information is recovered after the parallel-to-serial conversion. Thus, it is possible to reduce the processing speed required for each error-correcting encoder, error-correcting decoder, and interleaver and/or deinterleaver.

(2) On the transmission side, the error-correcting encoding process is independently performed for each of the transmission antennas in a parallel manner after information is serial-to-parallel converted into the same number of data series as the transmission antennas. The interleaving process is performed after the parallel-to-serial conversion. On the reception side, the deinterleaving process is performed on each of the separated signal data series after the parallel-to-serial conversion. Further, the error-correcting decoding process is independently performed on each of the signal data series in a parallel manner after the serial-to-parallel conversion. Transmitted information is recovered after the parallel-to-serial conversion. Thus, it is possible to reduce the processing speed required for each error-correcting encoder and error-correcting decoder and to gain a space diversity effect.

(3) On the transmission side, the error-correcting encoding process is performed before information is serial-to-parallel converted into the same number of data series as the transmission antennas. The interleaving process is performed for each of the transmission antennas after the serial-to-parallel conversion. On the reception side, the deinterleaving process is performed on each of the separated signal data series. Further, the error-correcting decoding process is performed after the parallel-to-serial conversion, thereby recovering transmitted information. Thus, it is possible to reduce the amount of processing in each interleaver and deinterleaver.

(4) On the transmission side, whether to perform the error-correcting encoding process on information to be transmitted in a parallel manner or in a serial manner is selected. Also, whether to perform the interleaving process on the signals encoded with error-correcting codes in a parallel manner or in a serial manner is selected. Thus, it is possible to select an optimum transmission rate and channel encoding/interleaving method in accordance with the propagation state of radio waves and control information about the state of the receiver.

DETAILED DESCRIPTION OF THE PREFERRED EMBODIMENTS

In the following, embodiments of the present invention are described with reference to the drawings.

[Embodiment 1]

Figure 1:
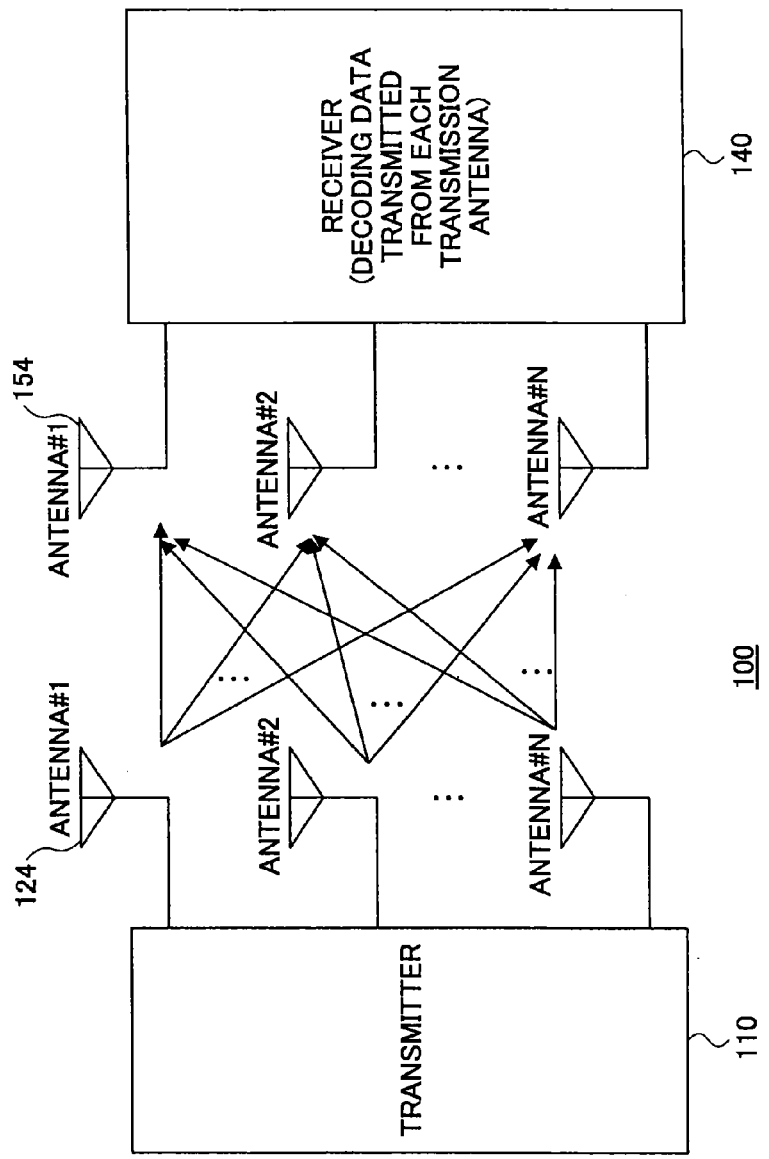
FIG. 1 is a conceptual diagram of a MIMO transmission system to which an embodiment of the present invention can be applied.
Figure 2:
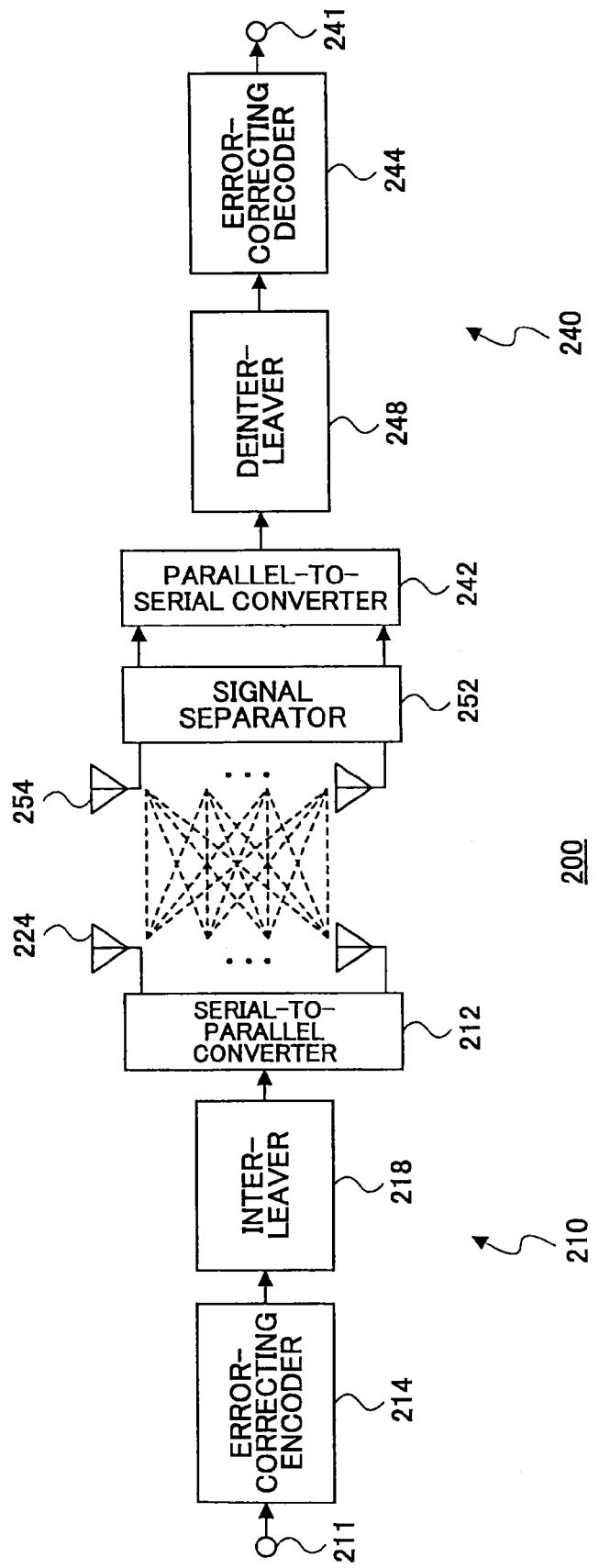
FIG. 2 is a block diagram of a conventional MIMO transmission system.
Figure 3:
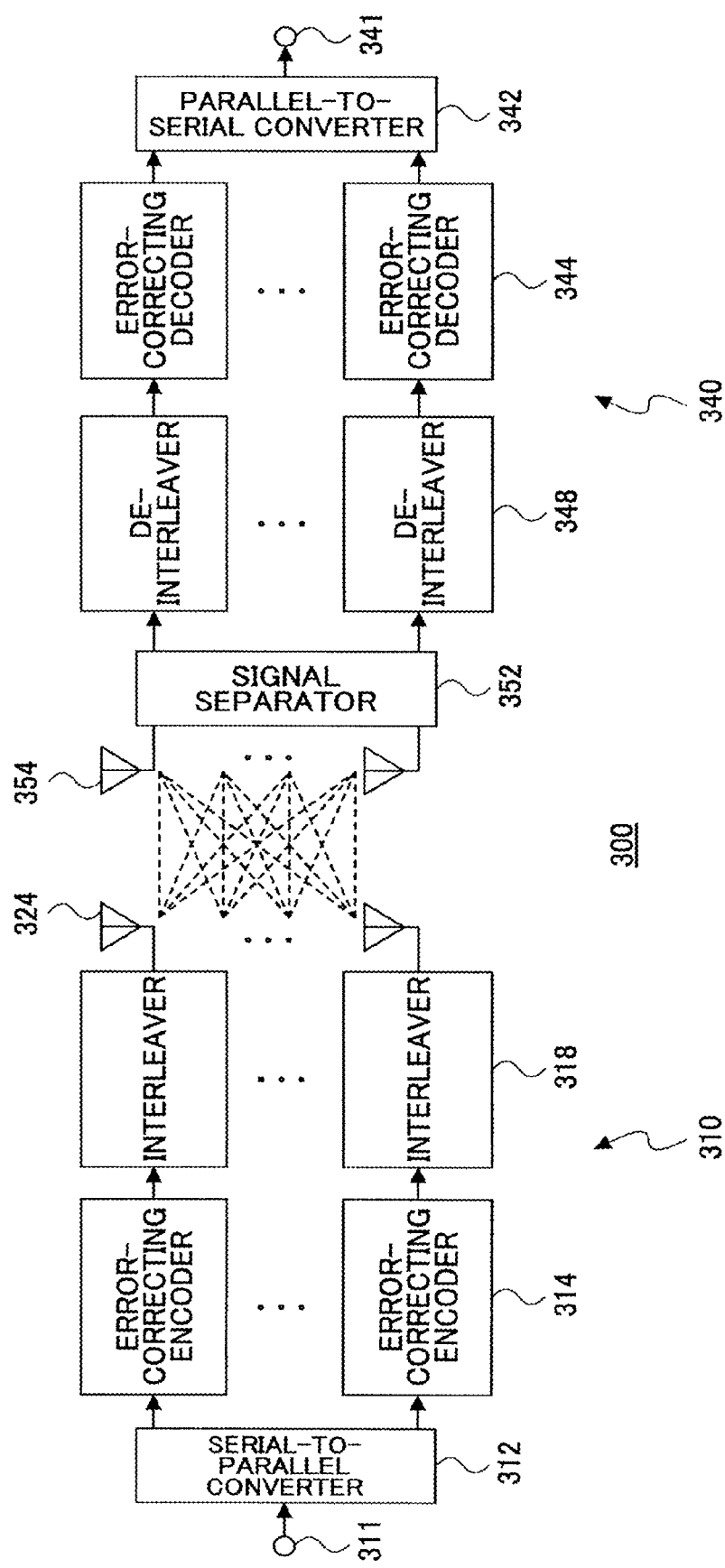
FIG. 3 is a schematic block diagram of a MIMO transmission system according to a first embodiment.

FIG. 3 is a schematic block diagram of a MIMO transmission system according to a first embodiment of the present invention. A transmitter 310 comprises a serial-to-parallel converter 312, N error-correcting encoders 314, N interleavers 318, and N antennas 324. A receiver 340 comprises N antennas 354, a signal separator 352, N deinterleavers 348, N error-correcting decoders 344, and a parallel-to-serial converter 342.

In the transmitter 310, first, serial transmission data 311 are serial-to-parallel converted. N parallel data series gained through the serial-to-parallel conversion are encoded with error-correcting codes and interleaved. Thereafter, each parallel data series is transmitted using the corresponding antenna 324.

Then, each of the antennas 354 of the receiver 340 receives signals transmitted from the transmitter 310. The received signals are separated into N parallel signals using the signal separator 352 of the receiver 340. The N parallel signals after the signal separation are first deinterleaved, and then the error-correcting codes are decoded. The N parallel signals are parallel-to-serial converted, thereby gaining data 341 in which the transmitted information is recovered.

According to this structure, it is possible to perform the error-correcting encoding process and the interleaving process on the transmission side on the N signal data series corresponding to the N transmission antennas in a parallel manner. Also, it is possible to perform the deinterleaving process and the error-correcting decoding process on the N signal data series in a parallel manner due to the signal separator 352 using the reception signals on the reception side. Thus, the processing speed required for each error-correcting encoder, decoder, interleaver, and deinterleaver is reduced to one Nth in comparison with the example of a conventional MIMO transmission system. Accordingly, the size of the interleaver and the deinterleaver can be reduced.

[Embodiment 2]

Figure 4:
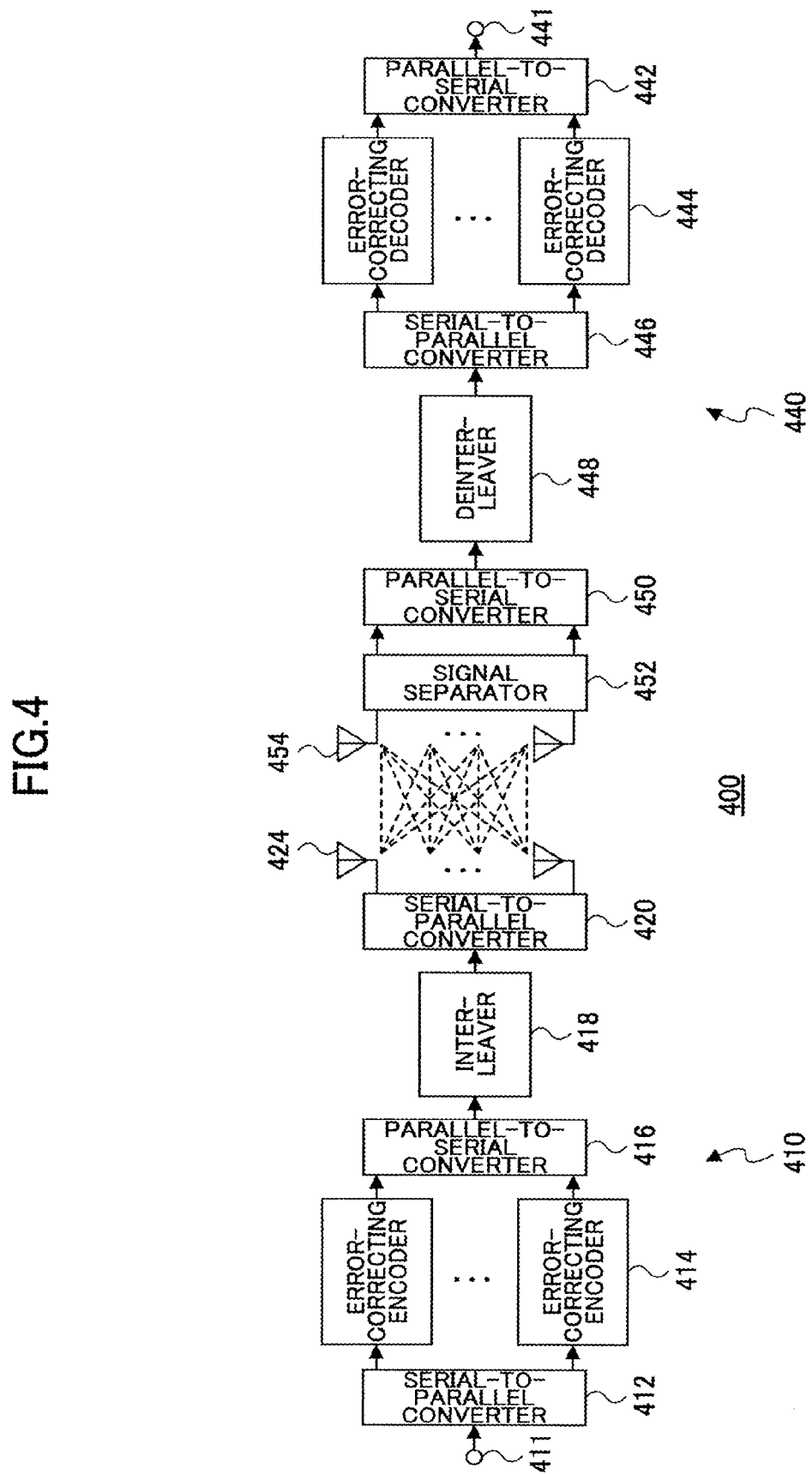
FIG. 4 is a schematic block diagram of a MIMO transmission system according to a second embodiment.

FIG. 4 is a schematic block diagram of a MIMO transmission system according to a second embodiment of the present invention. A transmitter 410 comprises a serial-to-parallel converter 412, M error-correcting encoders 414, a parallel-to-serial converter 416, an interleaver 418, a serial-to-parallel converter 420, and N antennas 424. A receiver 440 comprises N antennas 454, a signal separator 452, a parallel-to-serial converter 450, a deinterleaver 448, a serial-to-parallel converter 446, M error-correcting decoders 444, and a parallel-to-serial converter 442.

In the transmitter 410, first, serial transmission data 411 is serial-to-parallel converted. M parallel data series gained through the serial-to-parallel conversion are encoded with error-correcting codes independently in a parallel manner. Thereafter, the encoded parallel data series are parallel-to-serial converted and interleaved. The interleaved serial data are serial-to-parallel converted, and then each of the parallel data series is transmitted using the corresponding N transmission antenna 424.

Then, each of the N antennas 454 of the receiver 440 receives signals transmitted from the transmitter 410. The received signals are separated into N parallel signals using the signal separator 452 of the receiver 440. The N parallel signals after the signal separation are first parallel-to-serial converted and the obtained serial data are deinterleaved. Thereafter, the deinterleaved serial data are serial-to-parallel converted again and an error-correcting decoding is performed on the M signal data series independently in a parallel manner. The decoded parallel data are parallel-to-serial converted, thereby gaining data 441 in which the transmitted information is recovered.

The numbers N and M may or may not be the same.

According to the structure of the second embodiment, it is possible to perform the error-correcting encoding process on each signal data series after the serial-to-parallel conversion on the transmission side. Also, it is possible to perform the error-correcting decoding process on each of the signal data series after the signal separation in a parallel manner on the reception side. Thus, the amount of processing required for each error-correcting encoder and error-correcting decoder is reduced to one Mth in comparison with the example of a conventional MIMO transmission system.

Further, a space diversity effect on the interleaving can be obtained by performing the interleaving process on serial information before the serial-to-parallel conversion into signals for each of the transmission antennas. Thus, the characteristics of an error rate are improved in comparison with the first embodiment.

[Embodiment 3]

Figure 5:
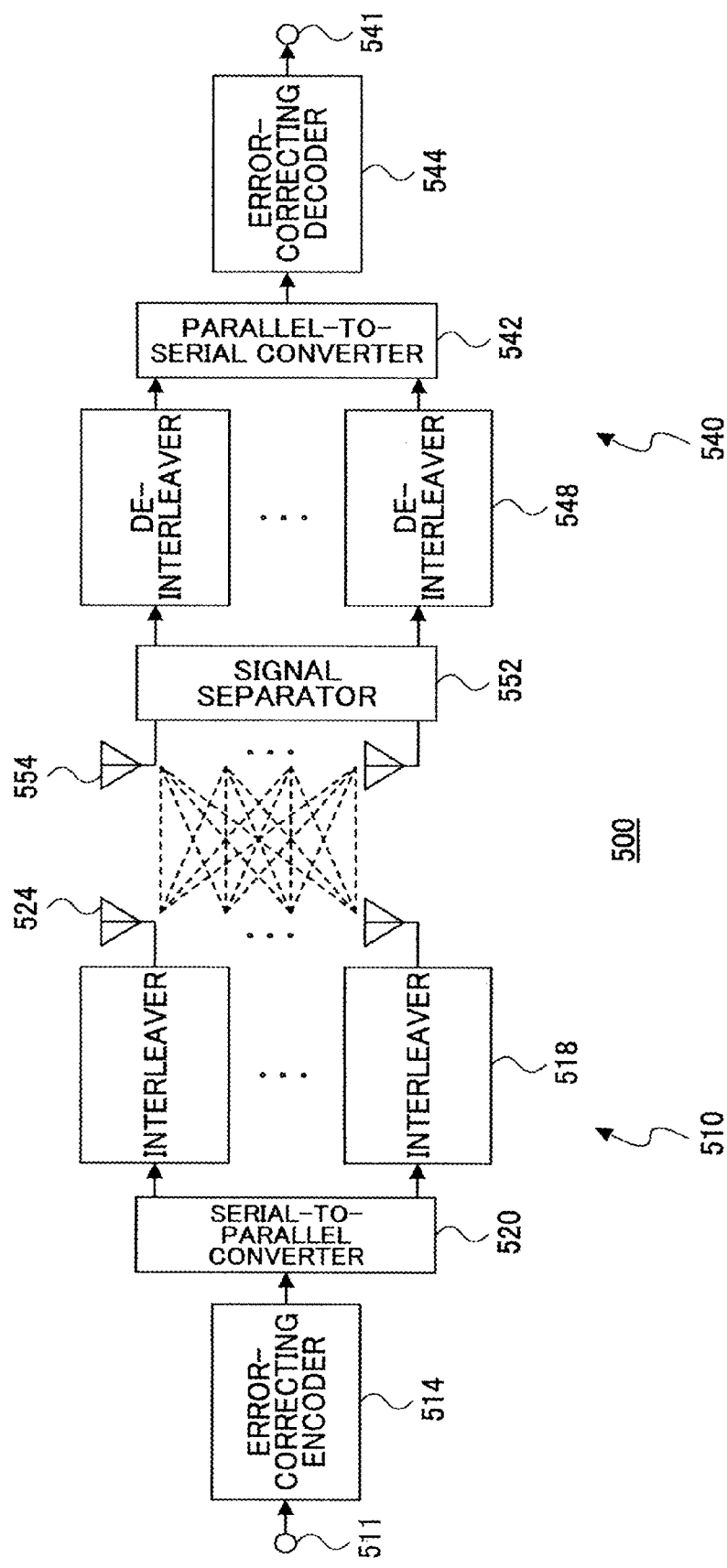
FIG. 5 is a schematic block diagram of a MIMO transmission system according to a third embodiment.

FIG. 5 is a schematic block diagram of a MIMO transmission system according to a third embodiment of the present invention. A transmitter 510 comprises an error-correcting encoder 514, a serial-to-parallel converter 520, an interleaver 518, and N antennas 524. A receiver 540 comprises N antennas 554, a signal separator 552, a deinterleaver 548, a parallel-to-serial converter 542, and an error-correcting decoder 544.

In the transmitter 510, first, serial transmission data 511 are encoded with error-correcting codes. Then, the encoded data are serial-to-parallel converted and N parallel data series gained through the serial-to-parallel conversion are interleaved independently in a parallel manner. Thereafter, each parallel data series is transmitted using the corresponding antenna 524.

Then, each of the N antennas 554 of the receiver 540 receives signals transmitted from the transmitter 510. The received signals are separated into N parallel signals using the signal separator 552 of the receiver 540. The N parallel signals after the signal separation are first deinterleaved and then parallel-to-serial converted. An error-correcting decoding is performed on the gained serial data, thereby gaining data 541 in which the transmitted information is recovered.

According to this structure, it is possible to perform the interleaving process on each signal data series after the serial-to-parallel conversion on the transmission side. Also, it is possible to perform the deinterleaving process on each of the signal data series after the signal separation in a parallel manner on the reception side. Thus, the processing speed required for each interleaver and deinterleaver is reduced to one Nth in comparison with the example of a conventional MIMO transmission system.

Figure 6:
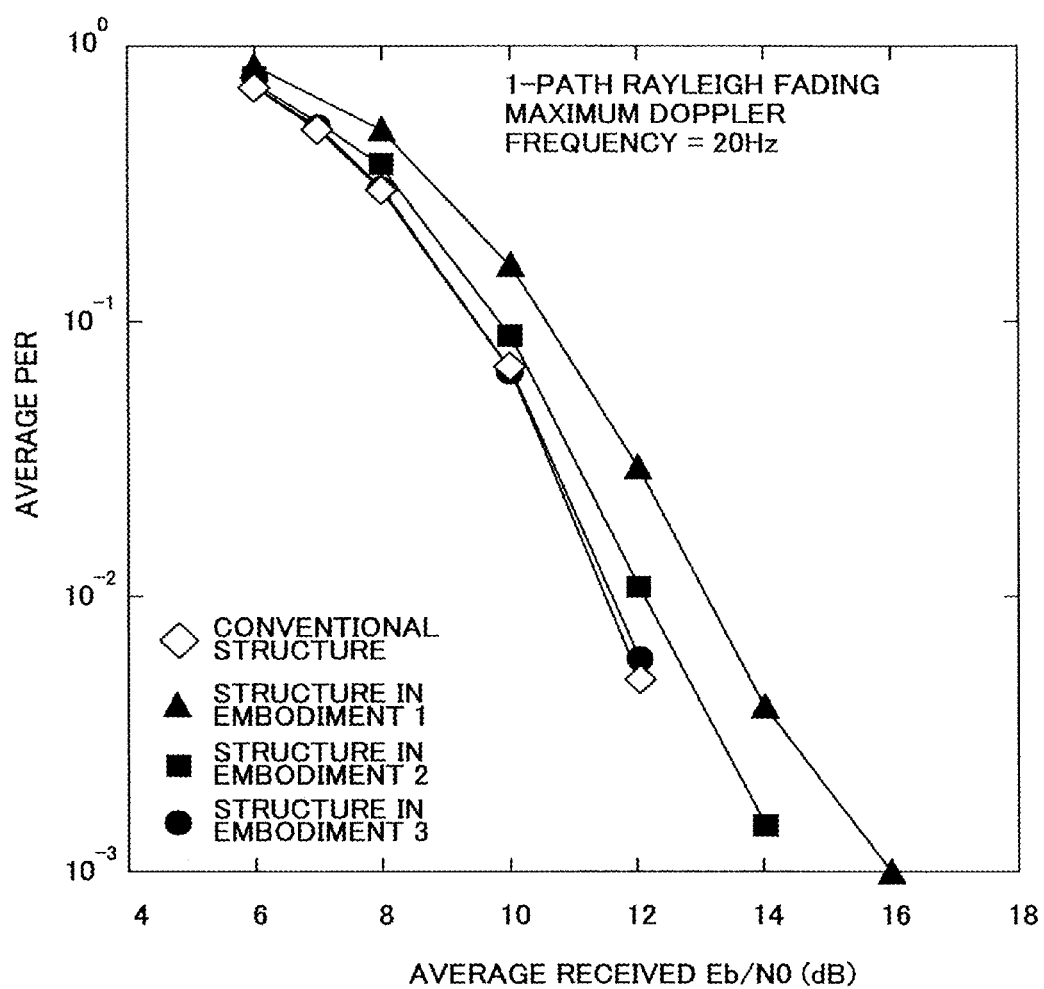
FIG. 6 is a comparative graph of a conventional MIMO transmission system and MIMO transmission systems according to embodiments.

FIG. 6 shows a result of computer simulation regarding the characteristics of average packet error rates of received Eb/No (Eb: electric power of received signals per one bit of information, No: noise power density) in the MIMO transmission systems according to the example of conventional techniques and the first through the third embodiments. In this evaluation, the number of the transmission antennas is N=4, a turbo encoding process with a constraint length of 4 is used as an error-correcting encoding process on the transmission side, and a symbol interleaving process is used as an interleaving process on the basis of the document by N. Maeda, H. Atarashi, and M. Sawahashi, "Performance comparison of channel interleaving methods in frequency domain for VSF-OFCDM broadband wireless access in forward link," IEICE Trans. Commun., vol. E86-B, no. 1, pp. 300-313, January 2003. On the reception side, signal separation is performed on the basis of maximum likelihood detection and Max Log-MAP algorithm with 8 iterations is used for error-correcting. In addition, a one-path Rayleigh fading channel with a maximum Doppler frequency of 20 Hz is used as a propagation channel model.

In FIG. 6, the structure of the MIMO transmission system according to the first embodiment (black triangles) shows the degradation of the characteristics of a packet error rate by about 1.5 dB as compared with the conventional structure (outlined rhombuses). However, the processing speed required for each decoder and deinterleaver on the reception side can be reduced to ¼, so that processing delay in the decoder and deinterleaver can be reduced to ¼.

Next, the structure of the MIMO transmission system according to the second embodiment (black squares) is capable of reducing the processing speed required for each decoder on the reception side to ¼ as compared with the conventional structure (outlined rhombuses). Also, the structure of the MIMO transmission system according to the second embodiment is capable of controlling the degradation of the characteristics of a packet error rate within 0.5 dB relative to the conventional structure in accordance with the improved characteristics due to a space interleaving effect.

Further, the structure of the MIMO transmission system according to the third embodiment (black circles) is capable of reducing the amount of processing required for each deinterleaver on the reception side to ¼ as compared with the conventional structure (outlined rhombuses). Also, the structure of the MIMO transmission system according to the third embodiment is capable of gaining substantially the same characteristics of a packet error rate as that of the conventional structure.

In the aforementioned embodiments, the number of antennas on the transmission side and the number of antennas on the reception side are the same. However, the present invention is not limited to the same number of antennas but may employ different numbers of antennas on the transmission side and the reception side.

[Embodiment 4]

In a fourth embodiment, a transmitter changes the transmission rate in response to the reception status of radio waves in a receiver and the transmitter selects and uses an appropriate channel encoding/interleaving method in accordance with the change.

According to the first embodiment, the information bit rate of the error-correcting encoding process and the error-correcting decoding process can be reduced to one Nth and the size of the interleaver and the deinterleaver can be reduced. In addition, the work load in terms of the apparatus structure is most reduced. However, there is a disadvantage in that a diversity effect using the transmission antennas is not obtained and thus the reception quality is reduced.

According to the second embodiment, the information bit rate of the error-correcting encoding process and the error-correcting decoding process can be reduced to one Mth. Also, a diversity effect using the transmission antennas can be obtained to a certain extent by performing the interleaving across the transmission antennas. However, there is a disadvantage in that the size of the interleaver is increased as compared with the first embodiment.

According to the third embodiment, the size of the interleaver and the deinterleaver can be reduced. Also, optimum reception characteristics in the aforementioned embodiments can be obtained due to the space diversity effect. However, there is a disadvantage in that the error-correcting encoding and the error-correcting decoding must be processed at the speed of the information bit rate.

In the above-mentioned three embodiments, each has a trade-off between merits and demerits. Thus, in the fourth embodiment, the above-mentioned three embodiments are switched and used in accordance with the transmission rate. When the transmission rate is low (400 Mbps, for example), the amount of processing does not have a great influence, so that the third embodiment is used so as to obtain the optimum reception characteristics. When the transmission rate is high (1 Gbps, for example), the amount of processing has a great influence, so that the second embodiment is used so as to reduce the work load on the apparatus even at the sacrifice of the reception characteristics to a certain extent. When the reception status is good and the reception quality does not have a great influence while the apparatus structure is limited, the first embodiment can be used.

In the following, the procedure of controlling the fourth embodiment is described.

(1) The receiving station measures the reception status of radio waves (received SIR, for example).
(2) The receiving station notifies the transmitting station of the reception status of radio waves as an example of transmission control information using a reverse radio link.
(3) The transmitting station determines the transmission rate on the basis of the reception status of radio waves.
(4) The transmitting station determines a channel encoding/interleaving method on the basis of the determined transmission rate.
(5) The transmitting station performs the channel encoding/interleaving on data with the determined transmission rate, and then transmits the resultant transmission data. At the same time, transmission rate information (including a modulation method and a channel encoding rate) and information about which channel encoding/interleaving method is used are transmitted as the transmission control information.
(6) The receiving station identifies the transmission rate information and the information about which channel encoding/interleaving method is used from reception control information and receives the transmission data.

[Embodiment 5]

In the fourth embodiment, the transmission rate is changed in accordance with the reception status of radio waves in the receiver. Then the channel encoding/interleaving method is selected and used in accordance with the transmission rate. In a fifth embodiment, information about the processing capacity of the receiving station is used as the transmission control information in addition to the reception status of radio waves. The transmission rate is changed in accordance with the reception status and the processing capacity, and the channel encoding/interleaving method is selected and used in accordance with the transmission rate.

In the following, the procedure of controlling of the fifth embodiment is described.

(1) The receiving station measures the reception status of radio waves (received SIR, for example).
(2) The receiving station notifies the transmitting station of the reception status of radio waves and the processing capacity (the interleaving capacity and the error-correcting decoding capacity) of the receiving station as the transmission control information using the reverse radio link.
(3), (4) The transmitting station determines the combination of the transmission rate and the channel encoding/interleaving method on the basis of the reception status of radio waves and the processing capacity of the receiving station. When the reception quality is particularly good, the error-correcting encoding may not be performed.
(5) The transmitting station performs the channel encoding/interleaving on data with the determined transmission rate, and then transmits the resultant transmission data. At the same time, transmission rate information (including a modulation method and a channel encoding rate) and information about which channel encoding/interleaving method is used are transmitted as the reception control information.

(6) The receiving station identifies the transmission rate information and the information about which channel encoding/interleaving method is used from the reception control information and receives the transmission data.

[Embodiment 6]

Figure 7:
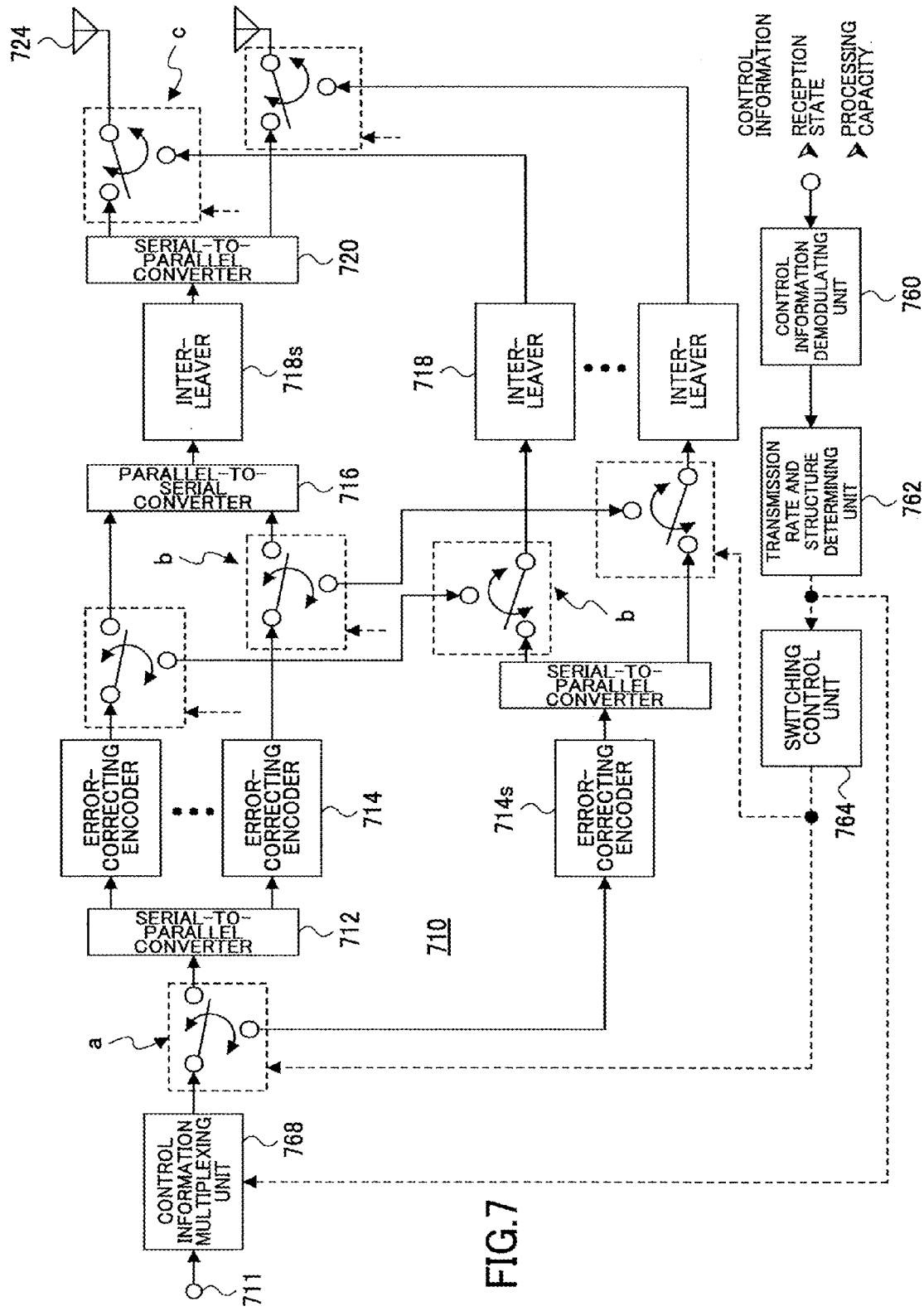
FIG. 7 is a block diagram of a transmitter performing a control method according to the fourth and fifth embodiments.

FIG. 7 is a block diagram of a transmitter for performing the control method according to the fourth and fifth embodiments. A control information demodulating unit 760 of a transmitter 710 receives and demodulates signals regarding the reception status of radio waves in the receiver and the processing capacity of the receiver (an example of the transmission control information). The modulated transmission control information is supplied to a transmission rate and structure determining unit 762. On the basis of the transmission control information, the transmission rate and structure determining unit 762 determines the transmission rate of transmission signals and which structure of the channel encoding/interleaving method is to be used. The determined information is sent to a control information multiplexing unit 768, multiplexed with transmission data, and transmitted to the receiver.

Also, the determined information about which structure of the channel encoding/interleaving method is to be used is supplied to a switching control unit 764. The switching control unit 764 switches each of switches a, b, and c in accordance with the determined information.

The switch a selects whether to perform the error-correcting encoding on the transmission information in a parallel manner. The switches b and c select whether to interleave the information encoded with error-correcting codes in a parallel manner or in a serial manner. By the selection of the switches a, b, and c in this manner, it is possible to select the structures of the aforementioned transmitters according to the first through third embodiments.

[Embodiment 7]

Figure 8:
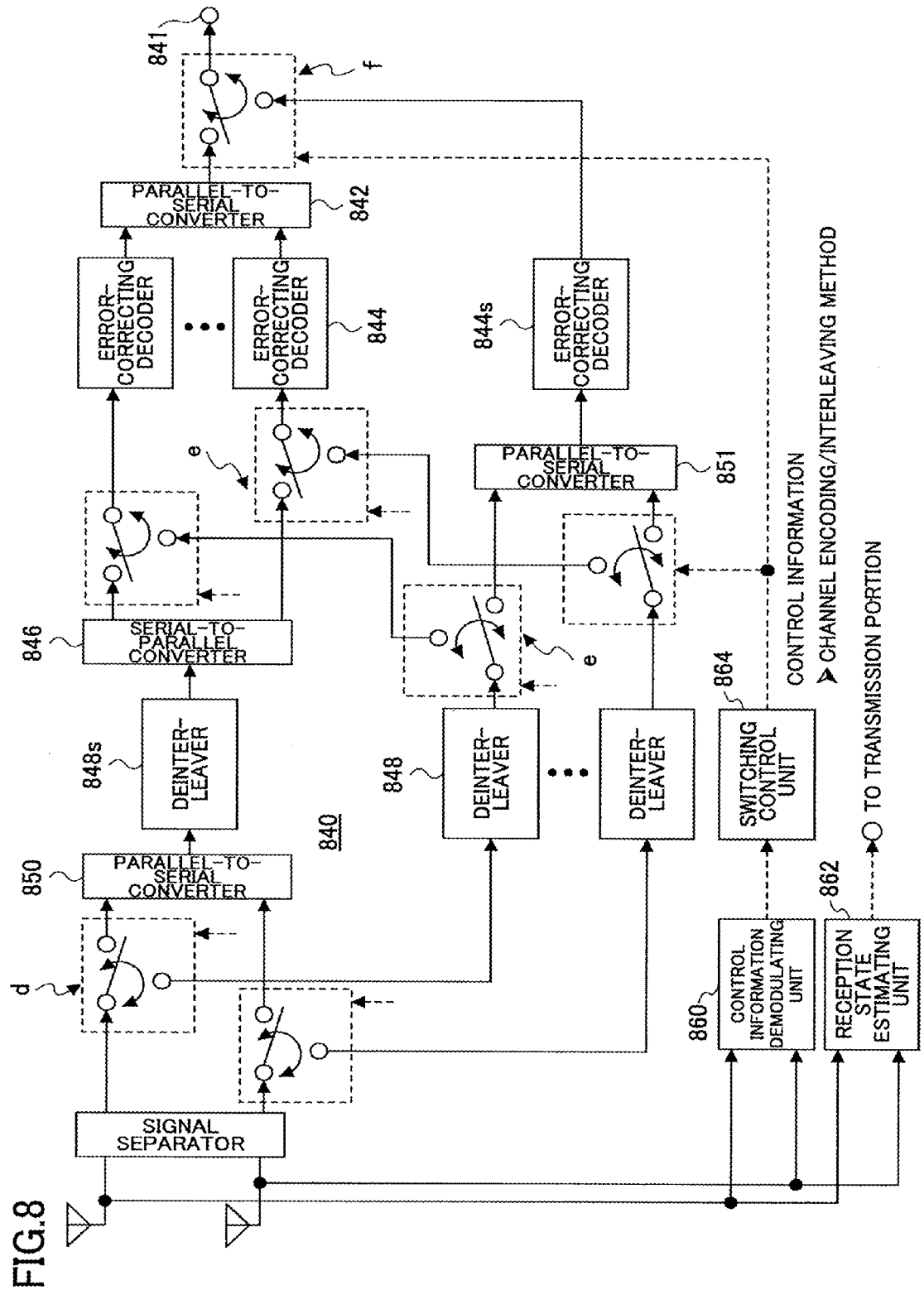
FIG. 8 is a block diagram of a receiver performing a control method according to the fourth and fifth embodiments.

FIG. 8 is a block diagram of a receiver for performing the control method according to the fourth and fifth embodiments. A reception status estimating unit 862 of a receiver 840 measures or estimates the reception status of the receiver and the result is transmitted to the transmitter 710 via a transmission unit. A control information demodulating unit 860 of the receiver 840 receives and demodulates the reception control information about the transmission rate and the channel encoding/interleaving method transmitted from the transmitter. The demodulated information is supplied to a switching control unit 864.

The switching control unit 864 switches each of switches d, e, and f in accordance with the demodulated information.

The switch d is for selecting whether to deinterleave received information in a parallel manner or in a serial manner. The switch d corresponds to the operations of the switches b and c of the transmitter. The switches e and f are switches for selecting whether to perform the error-correcting decoding process in a parallel manner or in a serial manner. The switches e and f correspond to the operation of the switch a of the transmitter.

By the selection of the switches d, e, and f in this manner, it is possible to select the structures of the aforementioned receivers according to the first through third embodiments.

The present invention is not limited to the specifically disclosed embodiments, and variations and modifications may be made without departing from the scope of the present invention.

The present application is based on Japanese priority application No. 2003-317464 filed Sep. 9, 2003, the entire contents of which are hereby incorporated herein by reference.

Industrial Applicability

The transmitter, the receiver, and the transmission system according to the present invention can be applied to a high-speed radio communication system such as WCDMA, and can also be used in radio communication fields without imposing an excessive work load on devices in a transmitter and a receiver, in which high-speed transmission with a low error rate is required.

The invention claimed is:

1. A transmitter used in a radio multiplex transmission system, the transmitter comprising:
   a plurality of selecting switches for selecting a connection relationship between serial data and a plurality of error-correcting encoders and a plurality of interleavers;
   a control information demodulating unit for receiving predetermined transmission control information from a receiver and for demodulating the received transmission control information;
   a structure determining unit for determining, in accordance with the demodulated transmission control information, whether to connect to the error-correcting encoders in a parallel manner for serial data to be transmitted and whether to connect to the interleavers in a parallel manner for the data encoded with error-correcting codes; and
   a switching control unit for controlling the plural selecting switches in accordance with the determined information.

2. A receiver used in a radio multiplex transmission system, the receiver comprising:
   a plurality of selecting switches for selecting a connection relationship between received signals and a plurality of deinterleavers and a plurality of error-correcting decoders;
   a control information demodulating unit for receiving predetermined reception control information from a transmitter and for demodulating the received reception control information;
   a switching control unit for controlling the plurality of selecting switches in order to select, in accordance with the demodulated reception control information, whether to connect to the deinterleavers in a parallel manner for received signals and whether to connect to the error-correcting decoders in a parallel manner for the deinterleaved signals.

* * * * *